(12) United States Patent
Lachambre et al.

(10) Patent No.: US 11,442,841 B2
(45) Date of Patent: *Sep. 13, 2022

(54) COMPUTER-IMPLEMENTED METHODS AND SYSTEMS FOR DETERMINING APPLICATION MATCHING STATUS

(71) Applicant: CITRIX SYSTEMS, INC., Fort Lauderdale, FL (US)

(72) Inventors: Sheldon Ferdinand Lachambre, London (GB); David Thornley, Algonquin, IL (US)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/377,632

(22) Filed: Apr. 8, 2019

(65) Prior Publication Data

US 2019/0235990 A1  Aug. 1, 2019

Related U.S. Application Data

(63) Continuation of application No. 15/463,300, filed on Mar. 20, 2017, now Pat. No. 10,275,336, which is a
(Continued)

(51) Int. Cl.
*G06F 11/36* (2006.01)
*G06F 8/75* (2018.01)
(Continued)

(52) U.S. Cl.
CPC ............ *G06F 11/3616* (2013.01); *G06F 8/70* (2013.01); *G06F 8/71* (2013.01); *G06F 8/75* (2013.01)

(58) Field of Classification Search
CPC .......... G06F 11/3616; G06F 8/71; G06F 8/70; G06F 8/75

See application file for complete search history.

(56) References Cited

U.S. PATENT DOCUMENTS 5,974,254 A * 10/1999 Hsu ........................... G06F 8/34
717/109
6,366,876 B1    4/2002 Looney
(Continued)

OTHER PUBLICATIONS

O'Donnel, G. "Smarts Appliaction Discovery Manager 5.0: Accelerating Server Data Center Consolidations, Application Migrations, and CMDB Projects"; Jan. 1, 2007; Presentation at EMC World Conference; Orlando, FL; pp. 22. ***See Priority U.S. Appl. No. 15/463,300, filed Mar. 20, 2017.
(Continued)

*Primary Examiner* — Matthew J Brophy
(74) *Attorney, Agent, or Firm* — Allen, Dyer, Doppelt + Gilchrist, PA

(57) ABSTRACT

A server includes one or more processors configured to determine relationships between one or more executable files, one or more library files, and one or more application programming interfaces (APIs) of a first application, and compare the determined relationships of the first application to determined relationships between one or more executable files, one or more library files, and one or more APIs of a second application. An indication of a matching status between the first and second applications is provided based on the compare.

14 Claims, 12 Drawing Sheets

Related U.S. Application Data continuation of application No. 14/643,593, filed on Mar. 10, 2015, now Pat. No. 9,600,396.

(60) Provisional application No. 61/951,403, filed on Mar. 11, 2014.

(51) Int. Cl.
*G06F 8/71* (2018.01)
*G06F 8/70* (2018.01)

(56) References Cited

U.S. PATENT DOCUMENTS

| | | | | |
|---|---|---|---|---|
| 6,594,822 B1* | 7/2003 | Schweitz | G06F 8/71 | 717/140 |
| 7,143,395 B2* | 11/2006 | Applin | G06F 8/71 | 717/130 |
| 7,458,073 B1* | 11/2008 | Darling | G06F 9/44521 | 717/172 |
| 7,739,516 B2* | 6/2010 | Brender | G06F 21/51 | 713/193 |
| 8,020,146 B2* | 9/2011 | Hudson, Jr. | G06F 8/44 | 717/140 |
| 8,401,973 B1 | 3/2013 | Biswas et al. | | |
| 8,769,501 B2* | 7/2014 | Salecker | G06F 8/75 | 717/126 |
| 8,997,221 B2* | 3/2015 | Dorrendorf | G06F 21/54 | 713/176 |
| 9,135,151 B2* | 9/2015 | Betak | G06F 11/368 | |
| 9,208,056 B1* | 12/2015 | Henriksen | G06F 11/3604 | |
| 9,330,184 B2 | 5/2016 | Thornley et al. | | |
| 9,594,665 B2* | 3/2017 | Baril | G06F 11/3452 | |
| 9,600,396 B2* | 3/2017 | LaChambre | G06F 8/75 | |
| 10,275,336 B2* | 4/2019 | Lachambre | G06F 8/75 | |
| 2003/0074573 A1* | 4/2003 | Hursey | G06F 21/564 | 726/22 |
| 2003/0154470 A1* | 8/2003 | Applin | G06F 8/71 | 717/170 |
| 2004/0210885 A1* | 10/2004 | Wang | G06F 8/71 | 717/130 |
| 2005/0021971 A1* | 1/2005 | Patankar | G06F 21/57 | 713/176 |
| 2005/0028143 A1* | 2/2005 | Aridor | G06F 8/71 | 717/136 |
| 2005/0198507 A1* | 9/2005 | Brender | G06F 12/1416 | 713/170 |
| 2006/0015807 A1 | 1/2006 | Chellis et al. | | |
| 2007/0022287 A1* | 1/2007 | Beck | H04L 63/145 | 713/164 |
| 2008/0022266 A1* | 1/2008 | Hudson | G06F 8/72 | 717/140 |
| 2008/0301639 A1* | 12/2008 | Bell | G06F 8/71 | 717/120 |
| 2010/0235823 A1* | 9/2010 | Garbers | G06F 8/71 | 717/170 |
| 2010/0333068 A1 | 12/2010 | Niimura et al. | | |
| 2011/0197276 A1* | 8/2011 | Dorrendorf | G06F 21/54 | 726/22 |
| 2011/0231832 A1* | 9/2011 | Dorn | G06F 8/65 | 717/170 |
| 2011/0321014 A1 | 12/2011 | Nagoria et al. | | |
| 2012/0036569 A1* | 2/2012 | Cottrell | H04L 63/0823 | 726/16 |
| 2012/0210294 A1* | 8/2012 | Gores | G06F 8/71 | 717/105 |
| 2013/0054703 A1 | 2/2013 | Neill et al. | | |
| 2013/0152046 A1* | 6/2013 | Salecker | G06F 8/71 | 717/122 |
| 2014/0096114 A1* | 4/2014 | Koren | G06F 11/3688 | 717/128 |
| 2014/0282450 A1* | 9/2014 | Jubran | G06F 8/71 | 717/151 |
| 2014/0297592 A1* | 10/2014 | Ohtake | G06F 16/219 | 707/638 |
| 2014/0380341 A1* | 12/2014 | Geimer | G06F 9/54 | 719/328 |
| 2015/0082280 A1* | 3/2015 | Betak | G06F 11/3688 | 717/124 |
| 2015/0154277 A1 | 6/2015 | Thornley et al. | | |
| 2015/0163232 A1* | 6/2015 | Liao | G06F 8/61 | 726/23 |
| 2015/0169319 A1* | 6/2015 | Ahmed | G06F 8/71 | 717/122 |
| 2015/0169320 A1* | 6/2015 | Ahmed | G06F 8/71 | 717/122 |
| 2015/0254161 A1* | 9/2015 | Baril | G06F 11/3616 | 717/124 |
| 2015/0254163 A1* | 9/2015 | Baril | G06F 11/3636 | 714/38.1 |
| 2015/0309790 A1* | 10/2015 | Henriksen | G06F 16/148 | 717/121 |
| 2015/0317235 A1 | 11/2015 | Lachambre et al. | | |
| 2015/0363176 A1* | 12/2015 | Sheng | G06F 8/42 | 717/143 |
| 2016/0048385 A1* | 2/2016 | Hall | G06F 9/445 | 717/168 |
| 2016/0179653 A1* | 6/2016 | Suzuki | G06F 8/40 | 717/126 |

OTHER PUBLICATIONS

Citrix Systems Inc.; "AppDNA 6.1 Basic User Guide"; 2012; 86 pages. ***See Prioirty U.S. Appl. No. 15/463,300, filed Mar. 20, 2017.

Citrix Systems Inc.; "AppDNA 6.1 Advanced Feature Guide"; 2012; 84 pages. **See Prioirty U.S. Appl. No. 15/463,300, filed Mar. 20, 2017.

* cited by examiner

COMPUTER-IMPLEMENTED METHODS AND SYSTEMS FOR DETERMINING APPLICATION MATCHING STATUS

RELATED APPLICATIONS

This application is a continuation of U.S. patent application Ser. No. 15/463,300 filed Mar. 20, 2017 which is a continuation of U.S. patent application Ser. No. 14/643,593, filed Mar. 10, 2015, which claims the benefit of U.S. Provisional Application No. 61/951,403, filed Mar. 11, 2014, both of which are herein incorporated by reference in their entireties.

BACKGROUND

Today's rapidly changing technology requires application users to periodically migrate from one system to another, such from as a system implemented using Windows 7™ platform to a system implemented using Windows 8™ platform, or changes to runtime environment, such as App-V™. For every migration, users have to validate each application to ensure compatibility with the new system. This process might need to be repeated for every major and/or minor new release of a given system. As users demand new and improved features, the frequency of updating systems increases, thereby also increasing the importance of the migration from one system or version to another.

Such migration is critical for enterprise users running thousands of applications for any given project on any given system. And each such application can be associated with many different algorithms. That is, verification of applications and their associated algorithms for any given system can be very complex and time consuming. Traditionally, such migration and verification is implemented manually, costing the organization a significant number of man hours (or months or years) and cost.

While a number of current techniques can be used to perform an accurate analysis to detect compatibility and matching of an application across different systems, the current techniques often involve manual testing of hundreds of applications using diagnostic tools such as process monitoring and debuggers to discover any defects. A disadvantage for such a process is the specialized knowledge required by a person in-charge of the testing.

Another drawback with the current techniques is an inefficiency associated with application testing, where each application of a set of identical applications that are residing across different systems is verified for compatibility for the new platform. A reduction in the amount of time it takes to verify compatibility of applications between platforms is useful for applications users, especially when migrating between systems.

Yet another drawback with the current techniques is an inefficiency associated with verifying that each application of a set of identical applications that are residing across different systems is installed correctly. A reduction in the amount of time it takes to verify installation of applications between platforms is useful for applications users, especially when migrating between systems.

SUMMARY

A server includes one or more processors configured to determine relationships between one or more executable files, one or more library files, and one or more application programming interfaces (APIs) of a first application, and compare the determined relationships of the first application to determined relationships between one or more executable files, one or more library files, and one or more APIs of a second application. An indication of a matching status between the first and second applications is provided based on the compare.

The first application comprises intrinsic linkage data associated with the determined relationships of the first application. The second application comprises intrinsic linkage data associated with the determined relationships of the second application. The compare comprises comparing the intrinsic linkage data associated with the determined relationships of the first application to the intrinsic linkage data associated with the determined relationships of the second application.

The intrinsic linkage data may comprise API imports and API exports that can be queried.

The intrinsic linkage data may comprise an import address table (IAT) and an export address table (EAT) in the one or more executable files.

The indication of a matching status comprises at least one of generation of a first icon indicating that the matching status is less than a percentage threshold of matches between the determined relationships of the first and second applications, generation of a second icon indicating that the matching status is greater than the percentage threshold of matches between the determined relationships of the first and second applications, and generation of a third icon indicating that the matching status is unknown or unsuccessful.

The first application is associated with a first platform, and the second application is associated with a second platform that is different from the first platform. The first and second applications may be the same applications. The second application may be a newer version of the first application.

The one or more processors may be further configured to determine a first digital signature associated with the determined relationships of the first application, and the compare comprises comparing the first digital signature to a second digital signature associated with the second application, with there being a match when the first second digital signature matches the second digital signature.

The first digital signature may comprise at least one hash value returned by a hash function, and the second digital signature may comprise at least one hash value returned by the hash function.

The one or more processors may be configured to determine a first dependency tree associated with the determined relationships of the first application, and the compare comprises comparing the first dependency tree to a second dependency tree associated with the second application, with there being a match when the first dependency tree matches the second dependency tree.

The first dependency tree may be represented by at least one hash value returned by a hash function operated on the first dependency tree, and the second dependency tree may be represented by at least one hash value returned by the hash function operated on the second dependency tree.

Another aspect is directed to a method for operating a server comprising determining relationships between one or more executable files, one or more library files, and one or more application programming interfaces (APIs) of a first application, and comparing the determined relationships of the first application to determined relationships between one or more executable files, one or more library files, and one or more APIs of a second application. An indication of a matching status between the first and second applications is provided based on the compare.

Yet another aspect is directed to a non-transitory computer readable medium for operating a server, and with the non-transitory computer readable medium having a plurality of computer executable instructions for causing the server to perform steps as described above.

BRIEF DESCRIPTION OF THE DRAWINGS

Reference will now be made to the accompanying drawings showing exemplary embodiments of this disclosure. In the drawings.

DETAILED DESCRIPTION

Reference will now be made in detail to the exemplary embodiments consistent with the embodiments disclosed herein, the examples of which are illustrated in the accompanying drawings. Wherever possible, the same reference numbers will be used throughout the drawings to refer to the same or like parts.

The present disclosure generally relates to application matching between applications residing in different systems. Exemplary embodiments relate to computer-implemented methods and systems for machine learning to determine a matching status for applications residing in different systems. Disclosed embodiments provide multiple technological advantages, including computerized application analyses to identify applications compatible with a new or updated platform. Moreover, the disclosed embodiments significantly reduce bandwidth requirements for application testing by transmitting hashes of an application's dependency tree, rather than a fuller description of the application binary and meta data. Thus, the disclosed embodiments enhance the functionality of computer hardware and software by ensuring compatibility while identifying any incompatibilities without the need for extensive manual testing and intervention.

Figure 1:
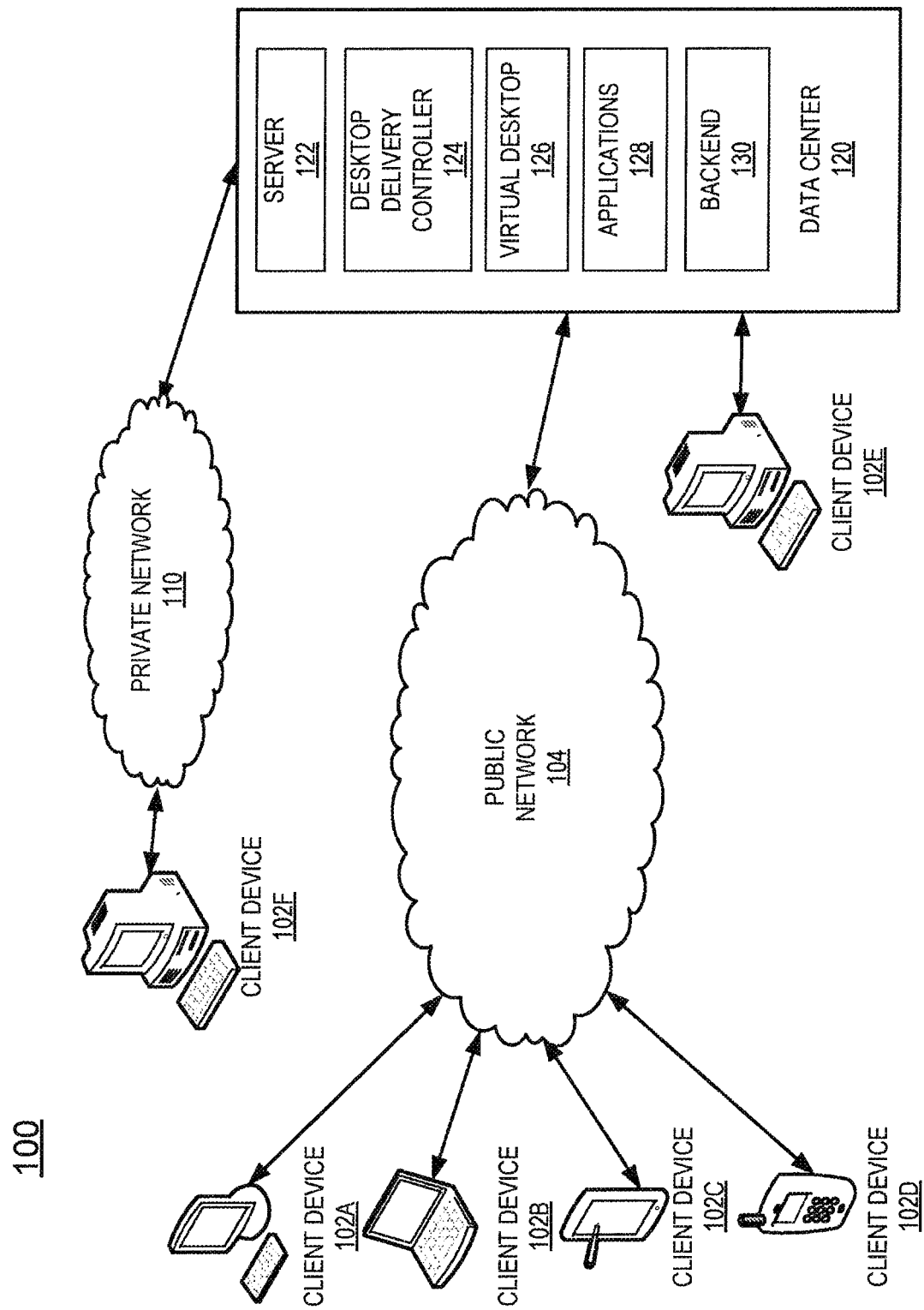
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102A-F, a public network 104, a private network 110, and a data center 120.

One or more client devices 102A-F are devices that can acquire remote services from data center 120 through various means. Client devices 102A-F can communicate with data center 120 either directly (e.g., client device 102E) or indirectly through a public network 104 (e.g., client devices 102A-D) or a private network 110 (e.g., client device 102F). When client device 102 communicates through public network 104 or private network 110, a communication link can be established. For example, a communication link can be established by public network 104, thereby providing a client device (e.g. client devices 102A-D) access to data center 120. A communication link can also be established by private network 110, thereby providing a client device (e.g. client device 102F) access to data center 120. While client devices 102A-F are portrayed as a computer (e.g., client devices 102A, 102E, and 102F), a laptop (e.g., client device 102B), a tablet (e.g., client device 102C), and a mobile smart phone (e.g., client device 102D), it is appreciated that client device 102 could be any type of device (e.g., wearable device) that communicates packets to and from data center 120. For example, client devices 102A-F can be referred to as a computing device, an electronic device, a mobile device, a communications device, and the like.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network, a wireless network, or a combination of both.

Data center 120 can be a central repository, either physical or virtual, for the storage, management, and dissemination of data and information pertaining to a particular public or private entity. Data center 120 can be used to house computer systems and associated components, such as one or physical servers, virtual servers, and storage systems. Data center 120 can include, among other things, one or more servers (e.g., server 122), a desktop delivery controller 124, a virtual desktop 126, applications 128, and a backend system 130. In this disclosure the term system refers to any system capable of hosting software applications. For example, a data center 120 can be a system that is hosting software applications (e.g., applications 128). In some embodiments, data center 120 can include more than one system such that each of those systems can be different from one another. For example, when company A merges (or acquires) company B, each company having their own system that can be different from the other, the combined company (including company A and company B) can have a single system or two different systems hosting software applications. A system hosting software applications can be referred to as a hosting system.

Server 122 can be an entity represented by an IP address and can exist as a single entity or a member of a server farm. Server 122 can be a physical server or a virtual server. In some embodiments, server 122 can include a hardware layer, an operating system, and a hypervisor creating or managing one or more virtual machines. Server 122 can provide one or more services to an endpoint. These services can include providing one or more desktops operating on one or more systems and one or more applications 128 to one or more endpoints (e.g., client devices 102A-F). For example, the one or more applications 128 can include Windows™- or SAP™-based applications and computing resources. In some embodiments, server 122 can provide application matching services. For example, application matching between applications residing on one platform and applications residing on another (e.g., Window 7™ and Windows 8™) can be performed at server 122. Moreover, the matching services can include applications compatibility services and application migration services.

In some embodiments, server 122 can provide application matching services. For example, application matching between applications residing in different systems (e.g., system A of organization A and system B of organization B) and/or different software platforms or platforms (e.g., Window 7™ and Windows 8™) can be performed at server 122. Alternatively, application matching can be performed so as to identify any application on disparate systems that matches with a golden reference (an exemplar application). A platform can include, for example, a Windows™-based platform (e.g., Windows 8™), an Apples-based platform (Mac OS X™), or a mobile-based platform such as Apple iOS™. It will be understood, in some embodiments, that the term platform as used herein can also refer to a hardware platform. It will also be understood, in some embodiments, that a system can include one or more platforms. For example, system A of organization A can include a plurality of platforms, Window 7™ and Windows 8™.

Desktop delivery controller 124 can be a device that enables delivery of services, such as virtual desktops 126 to client devices (e.g., client devices 102A-F). Desktop delivery controller 124 can provide functionality required to manage, maintain, and optimize all virtual desktop communications. In some embodiments, desktop delivery controller 124 can control, manage, maintain, or optimize the provisioning of applications 128. In some embodiments, controlling, managing, maintaining, or optimizing the provisioning of applications 128 can be implemented for one or more systems. That is, desktop delivery controller 124 can enable delivery of application migration and matching services for one or more systems.

In some embodiments, one or more virtual desktops 126 can provide one or more applications 128. Virtual desktops 126 can include hosted shared desktops allowing multiple users to access a single shared remote-desktop-services desktop, virtual desktop infrastructure desktops allowing each user to have their own virtual machine, streaming disk images, a local virtual machine, individual applications (e.g., one or more applications 128), or a combination thereof. In some embodiments, applications 128 can be associated with one or more systems. That is, one or more virtual desktops 126 can provide one or more applications 128 that can be used to verify application matching and application migration corresponding to a system.

Backend system 130 can be a single or multiple instances of computer networking hardware, appliances, or servers in a server farm or a bank of servers. Backend system 130 can interface directly or indirectly with server 122. For example, backend system 130 can include Microsoft Active Directory, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP). Backend system 130 can provide data, services, or a combination of both to data center 120, which can then provide that information via varying forms to client devices 102 or branch office 140 (not shown).

Figure 2A:
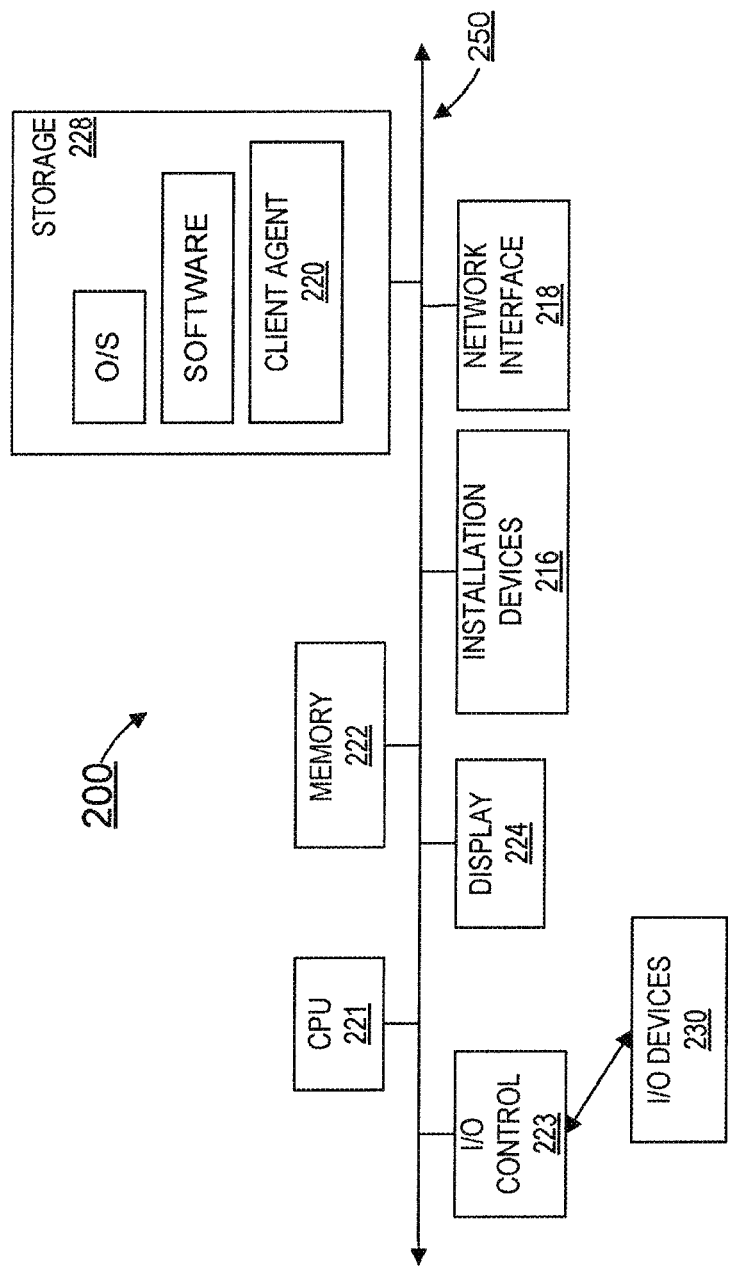
FIGS. 2A-2B are block diagrams of an exemplary computing device, consistent with embodiments of the present disclosure.
Figure 2B:
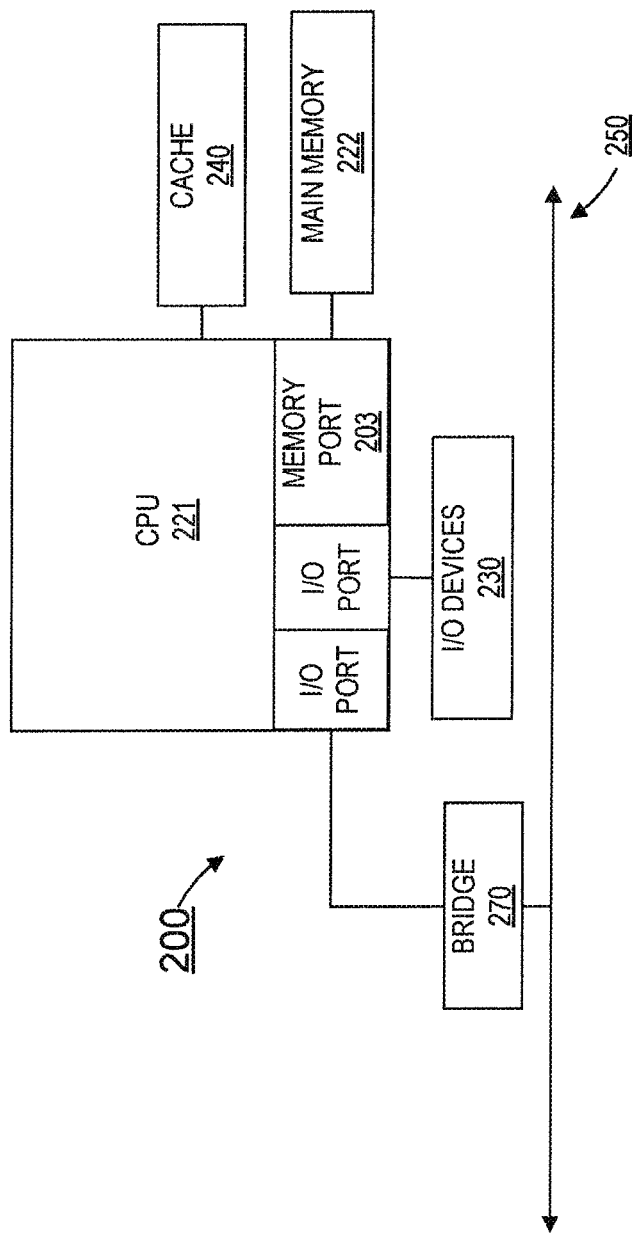

As shown in FIGS. 2A-2B, each computing device 200 (such as server 122 or a client device interfacing with server 122) includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). CPU 221 can be, for example, one or more general-purpose microprocessors, becoming one or more special-purpose microprocessors during the importing, analyzing, reporting, and/or displaying steps of application matching process as described herein, or can be a reduced instruction set of one or more microprocessors.

The memory includes a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), flash drive, flash memory, RAM, one or more caches, one or more registers, or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. One of ordinary skill in the art would appreciate that CPU 221 can also communicate with memory 222 and other devices in manners other than through system bus 250, such as through serial communication manners or point-to-point communication manners. Furthermore, I/O device 230 can also provide storage and/or an installation medium for the computing device 200.

FIG. 2B depicts an embodiment of an exemplary computing device 200 in which CPU 221 communicates directly with main memory 222 via a memory port 203. CPU 221 can communicate with a cache 240 via a secondary bus, sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port. In further embodiments, I/O device 230 can be a bridge 270 between system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

As shown in FIG. 2A, computing device 200 can support any suitable installation device 216, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Figure 3A:
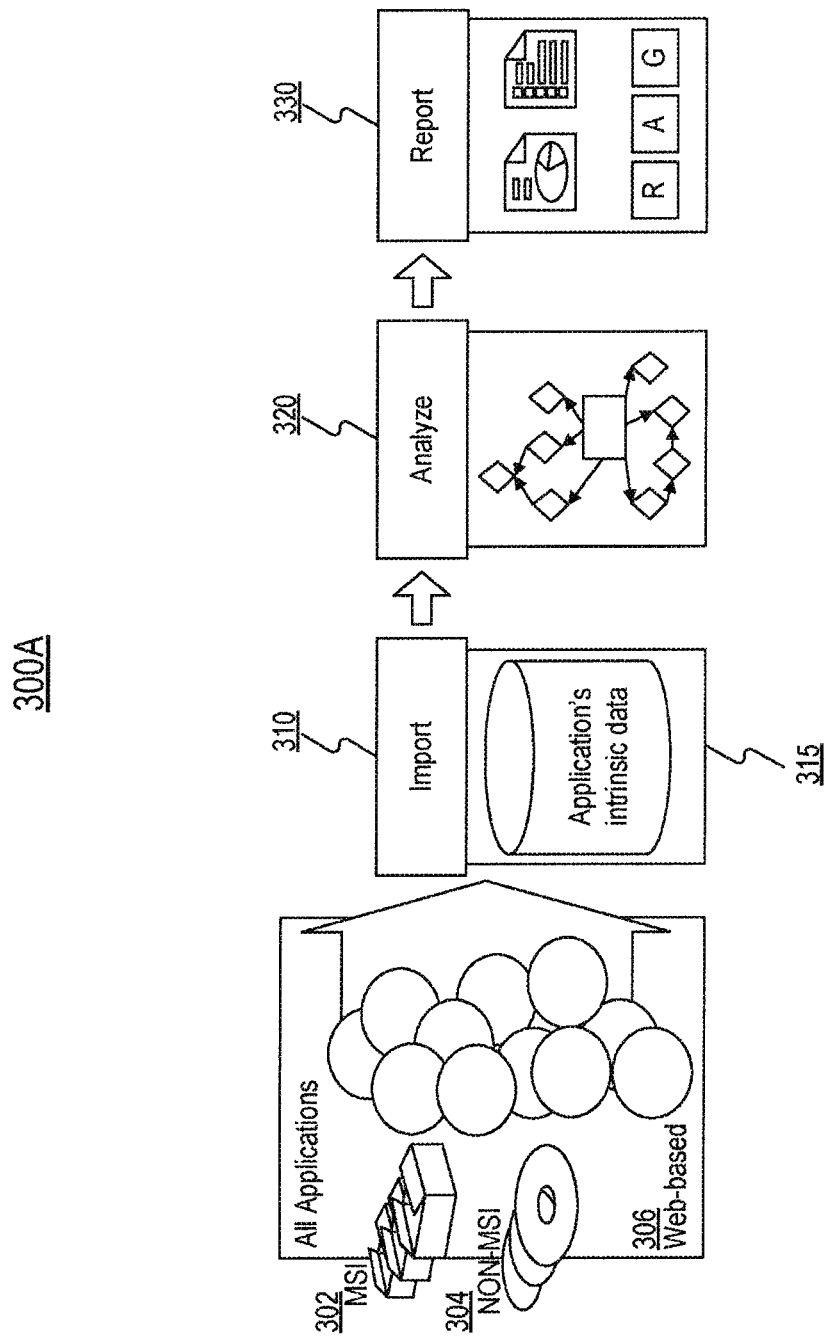
FIG. 3A is a block diagram of an exemplary process implementing an application matching system, consistent with embodiments of the present disclosure.

FIG. 3A depicts a block diagram of an exemplary process 300A implementing an application matching system. Exemplary process 300A can comprise steps including importing applications 310, analyzing the imported applications 320, and generating reports 330. Applications can be the raw material for the application matching system. When applications are imported, the application matching system can interrogate each application's files, registry entries, and application programming interface (API) usage to expose the application's intrinsic data that can uniquely identify the application.

Figure 3B:
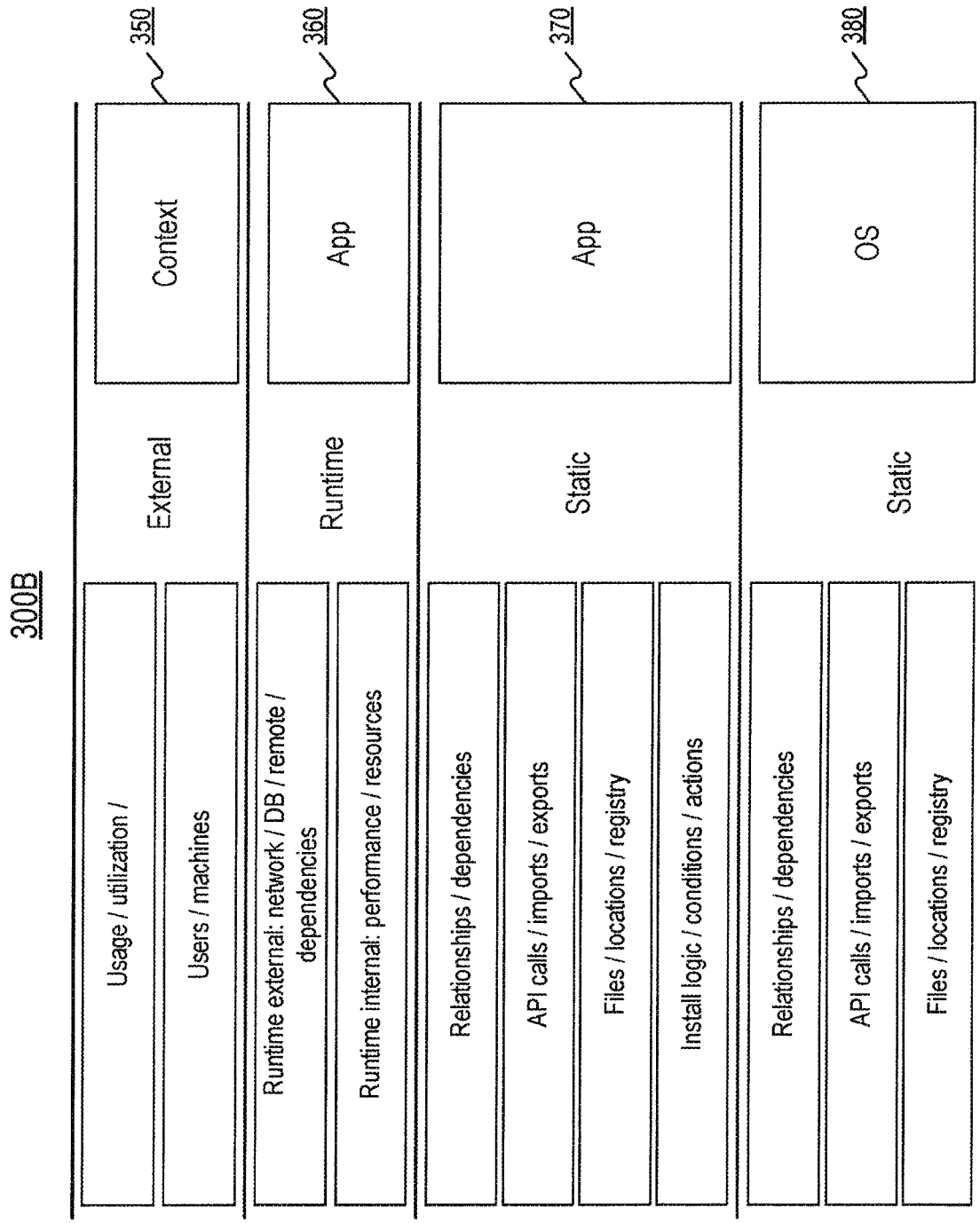
FIG. 3B is a block diagram illustrating exemplary application heuristic data points, consistent with embodiments of the present disclosure.

Each application can include a plurality of data points, which can be referred to as the application's intrinsic data. In some embodiments, the data points of the application's intrinsic data can be based on heuristics. For example, each application can include over 68,000 data points. An example of these data points is illustrated in FIG. 3B. As shown in FIG. 3B, these data points can include information associated with an application's static data 370 and also runtime data 360. Application's static data 370 can include information associated with install logic, install conditions, and/or install actions. Such data can also include information associated with application's files, registry settings, and/or configuration settings. It can further include information associated with API calls, API imports, and/or API exports. Additionally, static data can include information associated with relationships and/or dependencies within an application (e.g., dependency tree of FIG. 4). Runtime data 360 of application's intrinsic data can include either runtime internal data regarding performance and resources, or runtime external data regarding dependencies between network, database, etc. These data points can also include an operating system's static data 380. For example, operating system's static data can include information associated with operating system's files, registry settings, and/or configuration settings. It can also include information associated operating system's API calls, API imports, and/or API exports. Additionally, operating system's static data can also include information associated with relationships and/or dependencies of an operating system. These data points can also include information associated with external context 350. For example, external context 350 can include information associated with users and/or machines used by the users. External context 350 can also include information associated with usage and/or utilization of application matching system resources.

Figure 4:
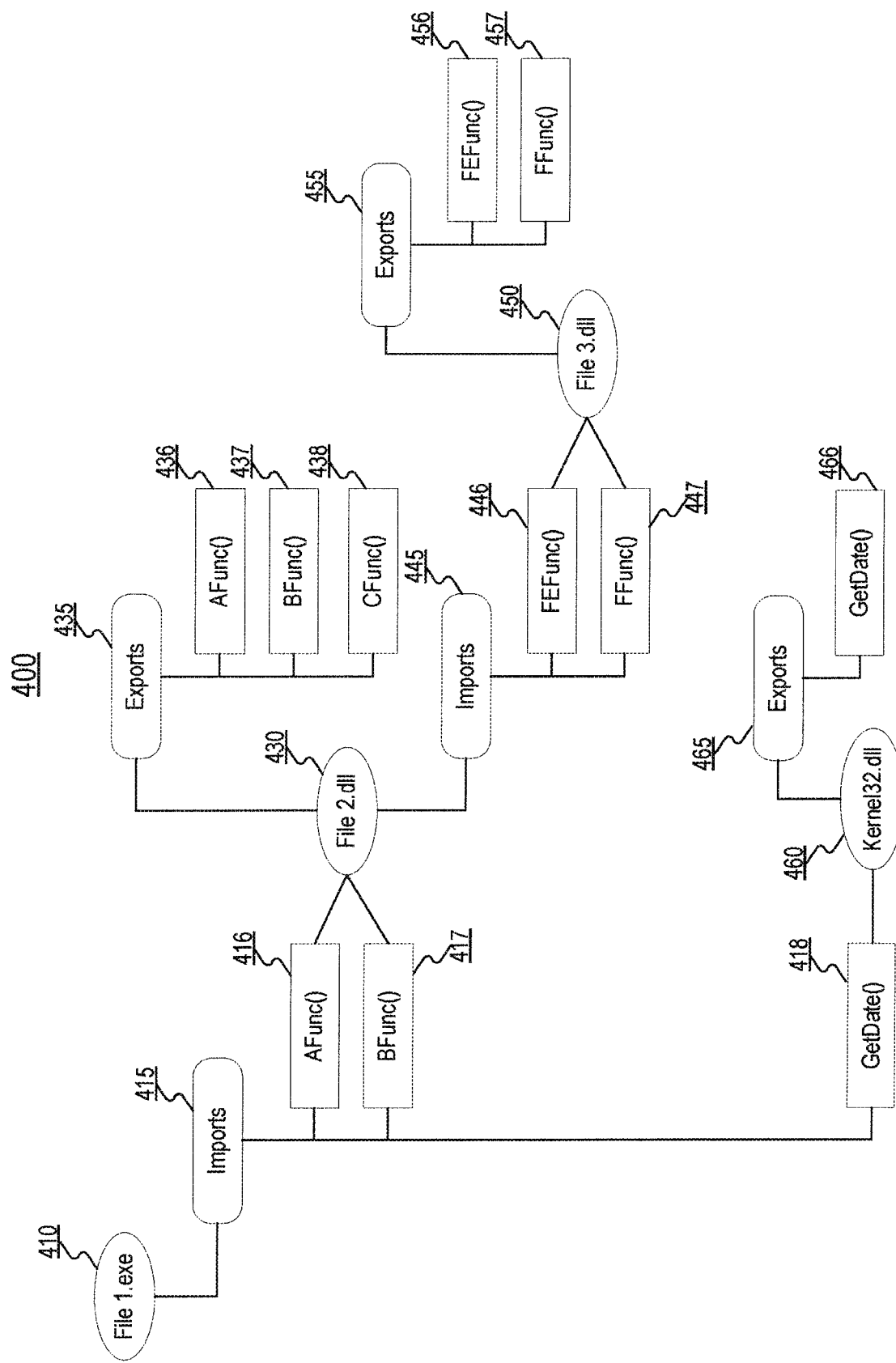
FIG. 4 is a block diagram illustrating an exemplary application dependency tree, consistent with embodiments of the present disclosure.

In some exemplary embodiments, an application's intrinsic data can be organized as a dependency tree that represents a relationship between various executable files and API calls. An exemplary dependency tree (e.g., dependency tree 400) is shown in FIG. 4. Dependency tree can be created for any application that uses accessible linkage such as, for example, API imports and API exports that can be queried. For example, accessible linkage can include import address table (IAT) and export address table (EAT) in a portable execution or any other executable file. A dependency tree can be created by traversing through files (e.g., executable files like .exe files and/or .dll files) and/or API calls (e.g., calls associated with IAT and EAT) included in the application. As shown in FIG. 4, dependency tree 400 can include an executable file (e.g., File 1.exe 410) at the top-level hierarchy, this could also be a library file like a DLL at the top-level hierarchy. File 1.exe 410 can include import functions (e.g., Imports 415). Imports 415 can include functions, AFunc( ) 416, BFunc( ) 417, and GetDate( ) 418. Functions AFunc( ) 416 and BFunc( ) 417 can depend on executable file File 2.dll 430. That is, File 1.exe 410 can directly depend on a second file, File 2.dll 430. Similarly, File 1.exe can also directly depend on another file, Kernel32.dll 460 through function, GetDate( ) 418. As shown in FIG. 4, Kernel32.dll 460 can include an export function (e.g., Exports 465) that comprises the function, GetDate( ) 466.

File 2.dll 430 can include export functions (e.g., Exports 435) and import functions (e.g., Imports 445). As shown in FIG. 4, Exports 435 can include functions AFunc( ) 436, BFunc( ) 437, and CFunc( ) 438. Imports 445 can include functions FEFunc( ) 446 and FFunc( ) 447, which can depend on another file, File 3.dll 450. That is, File 2.dll 430 can directly depend on a third file File 3.dll 450 and File 1.dll 410 can indirectly (through second file, File 2.dll 430) depend on the third file File 3.dll 450. FIG. 4 also shows that File 3.dll 450 can include export functions (e.g., Exports 455) that comprise functions FEFunc( ) 456 and FFunc( ) 457. As shown in FIG. 4, dependency tree 400 can depict relationships and/or linkages between various files and API calls included in an application. While dependency tree 400 shows a dependency tree that includes only three levels of hierarchy (e.g., File 1.exe 410 depending on File 2.dll 430 and further on File 3.dll 450), it is understood that an application can include dependencies between files (e.g., executables files) and/or API calls (e.g., calls associated with import address table and export address table) that can include any number of hierarchies.

Referring back to FIG. 3A, applications imported in importing step 310 can comprise any kind of application including, but not limited to, desktop applications (e.g., MSI applications 302, non-MSI applications 304), or web based applications (for example, web applications 306). MSI applications 302 can include, for example, Microsoft Installer™ or Windows Installer™ based applications. That is, MSI applications 302 can be applications that use a .msi file (Microsoft Installer™ or Windows Installer™) in the process of installation. Non-MSI applications 304 can be applications that use an interface other than Microsoft Installer™ or Windows Installer™ interface for installation, such as Microsoft App-V™ or a custom developed setup.exe file. In some embodiments, the imported applications can include any application or process that includes dependent linkages that, for example, depict relationships and/or linkages between various files and API calls.

Importing step 310 can be implemented differently between importing desktop applications and web applications. For example, Windows™ desktop applications can be imported using the applications' installation packages. These installation packages can include an .msi file or any other type of installation package used in the industry. In some embodiments, such installation packages can be App-V™ (e.g., .sft or .appv) packages. Web applications can be imported into the application matching system by using one of the two different exemplary approaches described below, or a combination of those approaches. In some embodiments, web applications can be imported by a directed web spider or web crawler to crawl over the run-time HTML pages and capture them for import into the application matching system. In some embodiments, importing can be accomplished by importing the web applications' source files into a database of application matching system.

Figure 5:
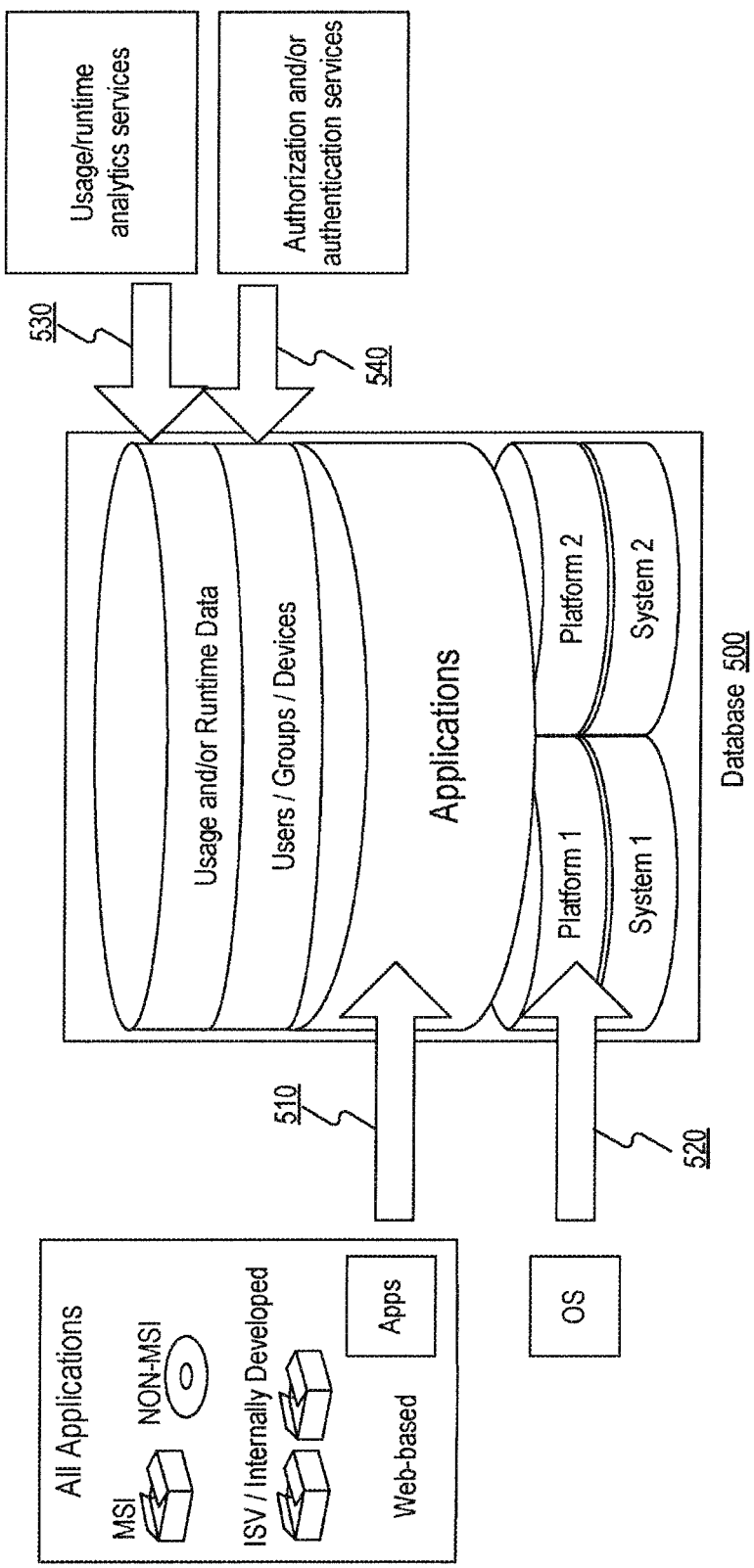
FIG. 5 is a block diagram of an exemplary database of an application matching system, consistent with embodiments of the present disclosure.

FIG. 5 depicts such an exemplary database, database 500, of an application matching system. In accordance with some embodiments, database 500 can be a structured collection of tables, lists, or other data for design verification setup and runtime execution. As such, the structure may be organized as a relational database or an object-oriented database. In some embodiments, database 500 can be a hardware system comprising physical computer readable storage media and input and/or output devices configured to receive and provide access to tables, lists, or other data structures. Furthermore, configured as a hardware system, database 500 can include one or more processors and/or displays.

In some embodiments, database 500 can reside within a server (e.g., server 122) hosting the application matching system. In some embodiments, database 500 can reside on a server (or on a distributed network of servers) remote from a server hosting the application matching system. Applications imported in importing step 510 of the application matching system can reside in database 500. Each such application can be associated with one or more matching algorithms (not shown), which can also reside in database 500. In some embodiments, matching algorithms are created by a user of the application matching system, whereas in other embodiments, such algorithms can already be created and saved in a universal algorithm library residing in database 500.

Database 500 can also include information associated with operating systems (e.g., operating system intrinsic data) 520, running on computing device 200. For example, operating systems running on computing device can include Windows 7™, Windows Server 2003™, Windows XP™, and Windows Server 2008 R2™. In some embodiments, information associated with operating system (e.g., operating system image or snapshot) can be uploaded by a user of the application matching system, whereas in other embodiments such information can be extracted by an application matching system itself. For example, operating system intrinsic data can include information describing a certificate chain on an operating system image. Using the signing certificate authority on the certificate chain, an algorithm can simply process the certificate chain until it identifies the certificate as either trusted or untrusted. It will be understood that the application matching system can also allow users to load multiple operating system images concurrently to enable the user to execute algorithms for matching with all such platforms in a single pass. Database 500 can further include information associated with usage and/or runtime data 530. Database 500 can further include information associated with auditing, performance, users, groups, and/or devices 540, as depicted in FIG. 5.

Figure 6:
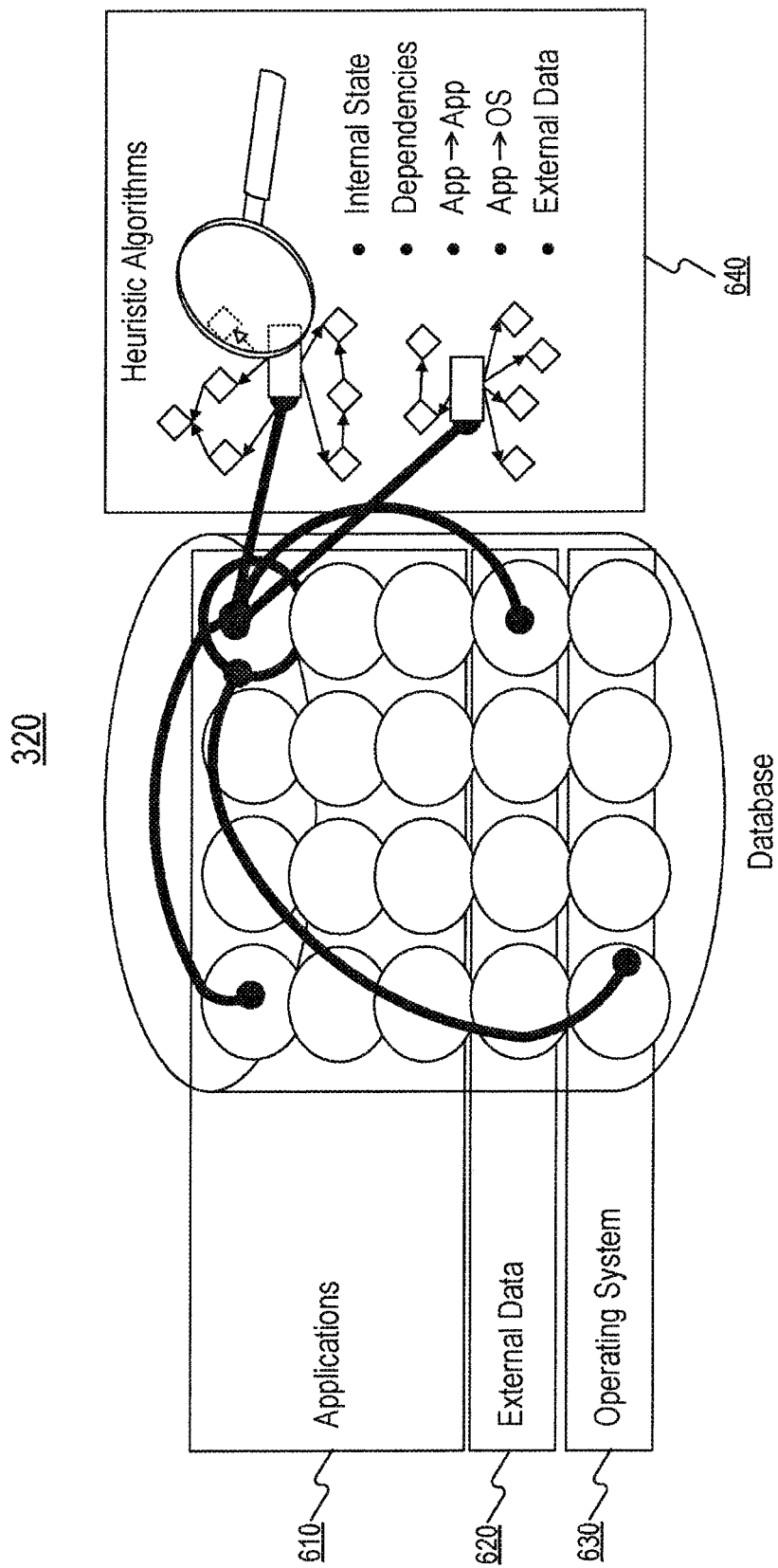
FIG. 6 is a block diagram showing an exemplary embodiment of application matching system performing an analysis of an application, consistent with embodiments of the present disclosure.

FIG. 6 depicts an exemplary analysis step 320 of an application matching system. After the applications are imported into the application matching system, those applications can be analyzed to check for matching between applications associated with different systems. An exemplary analysis process can include analyzing an application's intrinsic data comprising information associated with an application's install logic, files, registry settings, configuration settings, or API calls. In some embodiments, an analysis process can also include analyzing any of an operating system image data 630, external data 620, journal entries (not shown), or configuration manager (not shown) data associated with runtime environment. The analysis process can include analyzing an application's intrinsic data to create a dependency tree (e.g., dependency tree 400) of the application residing in a particular system or platform. A typical analysis process involves analyzing imported applications 610 just once. There may be embodiments, however, where imported applications 610 may need to be re-analyzed, for example, based on changes to any attributes of the one or more systems including an operating system of the one or more systems. Furthermore, if there are any changes to any of the other attributes of the one or more systems, imported applications 610 can also be re-analyzed.

In some embodiments, a matching status of an application can be determined by computing and comparing a digital signature associated with the application that uniquely identifies the application. A digital signature associated with an application can be a specific pattern. For example, an application's digital signature can be a hash value returned by a hash function. It is well understood that a hash function can be any algorithm that maps data of variable length to data of a fixed length (e.g., MD5 and SHA-2). It is well understood that even a one-bit change in the input data can result in a significant change in the hash value of the input data. Said differently, hash functions resulting in hash values are a good exemplary function that can uniquely identify a variable length of data including binary files. The values returned by a hash function can be called hash values, hash codes, hash sums, checksums, or simply hashes. In some embodiments where an application's digital signature is defined as a hash value returned by a hash function operated on an entire dependency tree of the application, an application matching system can determine a matching status between two applications by comparing each application's hash value. If the comparison results in a match between the hash values of the two applications, the application matching system can identify that the two applications are the same applications that may be residing on two different platforms or systems.

If, on the other hand, the comparison does not result in a match between the hash values of the two applications, the application matching system can identify that the two applications do not match. In some embodiments, when the comparison does not result in a match between a top-level hash values of the dependency trees of the two applications (e.g., File 1.exe 410), a hash value can be computed on a second-level hierarchy of the dependency tree (e.g., File 2.dll 430) for further comparison. If the comparison of hash values at the second-level hierarchy of the dependency trees results in a match between the two applications, the application matching system can identify that the two applications include the same files at the second-level hierarchy (e.g., File 2.dll 430) that were used for computing the hash value. If, however, the comparison of the hash values at the second-level hierarchy of the dependency tree does not match, then the process can be repeated to the third-level hierarchy of the dependency tree (e.g., File 3.dll 450), and so on. It will be understood that the hash values can be computed and later compared for any number of hierarchies of an application's dependency tree. It will be understood that an application's digital signature value can be defined in many ways other than and different from the exemplary hash function described above.

Imported applications can be associated with matching algorithms that can be used in the analysis process. In some embodiments, each imported application can be associated with one or more matching algorithms. Matching algorithms can be implemented as heuristic algorithms 640. In some embodiments, matching algorithms can relate to information associated with the one or more systems and/or platforms including internal states, dependencies, relationship between one application to another, relationship between an application and an operating system, or external data. Matching algorithms can also relate to operating system image-dependent algorithms, including dependencies on features that are provided by an operating system. When relevant, these algorithms can interrogate the operating system image data that has been loaded into the database (e.g., database 500) of the application matching system. These algorithms can check a variety of operating system image information 630, including: APIs, registry information, file management system for each fixed drive partition, the certificate store, or some matching settings.

The application matching system can generate reports (e.g., report step 330), as an output of analysis step 320. For example, such reports can contain information about a matching status for two or more applications that have been analyzed by the application matching system to determine whether the two or more applications match. In some embodiments, reports can include a plurality of icons to indicate a matching status for two or more applications. For example, icons represented by red (R), amber (A), and green (G) colors or indications can signify different matching statuses for applications (illustrated in FIG. 9). An icon G can indicate that a matching status between two or more applications is at least above a predetermined percentage. An icon R can indicate that a matching status between two or more applications is below a predetermined percentage. An icon A can indicate either that a matching status between two or more applications is unknown or that a matching determination is unsuccessful. It will be understood the above-listed definitions of icons are merely exemplary and other definitions are possible. An exemplary method describing a process of determining a matching status between two or more applications is described in FIGS. 7-10 below.

Figure 7:
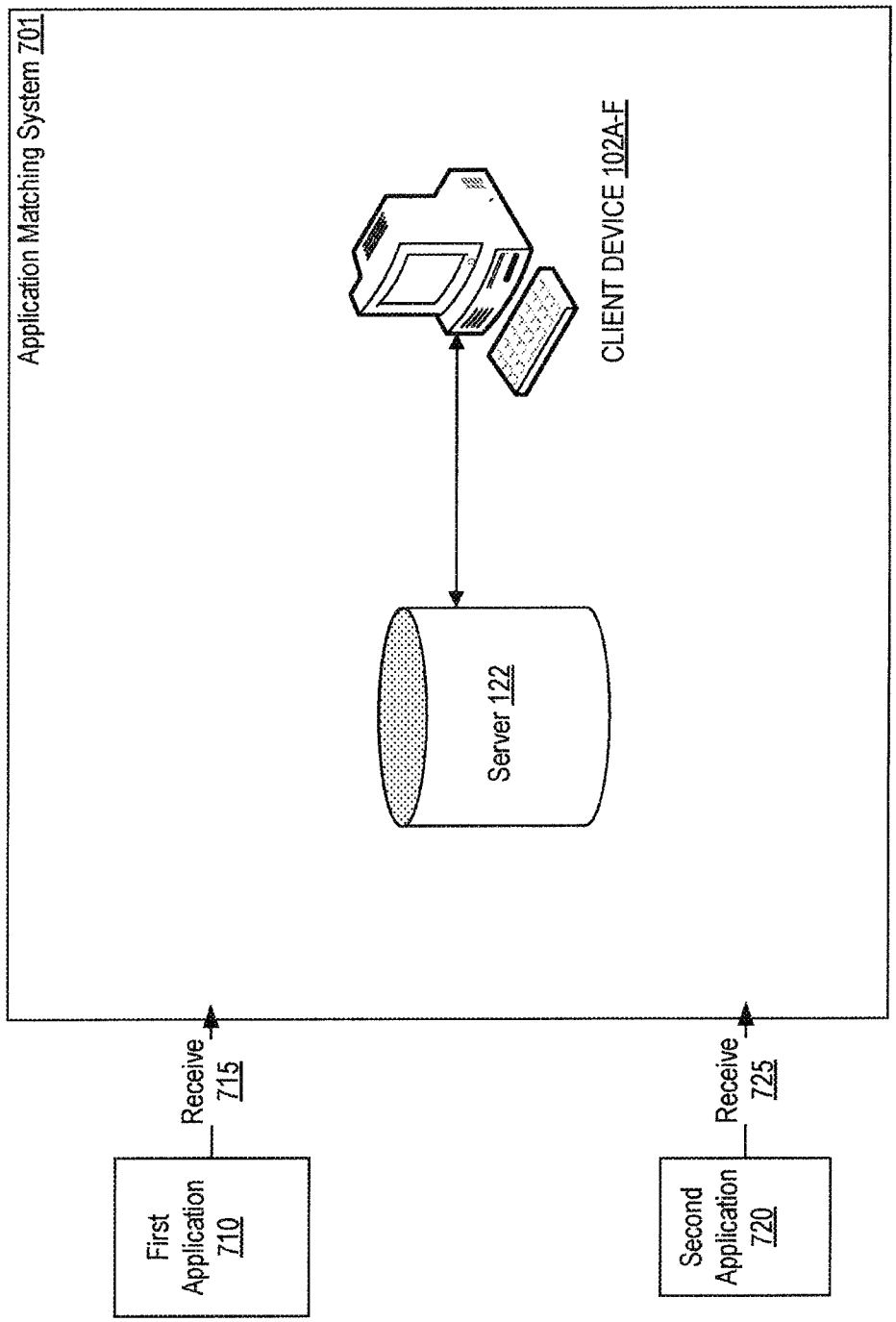
FIG. 7 is a block diagram showing an exemplary embodiment of application matching system receiving a matching status request between two or more applications, consistent with embodiments of the present disclosure.
Figure 8:
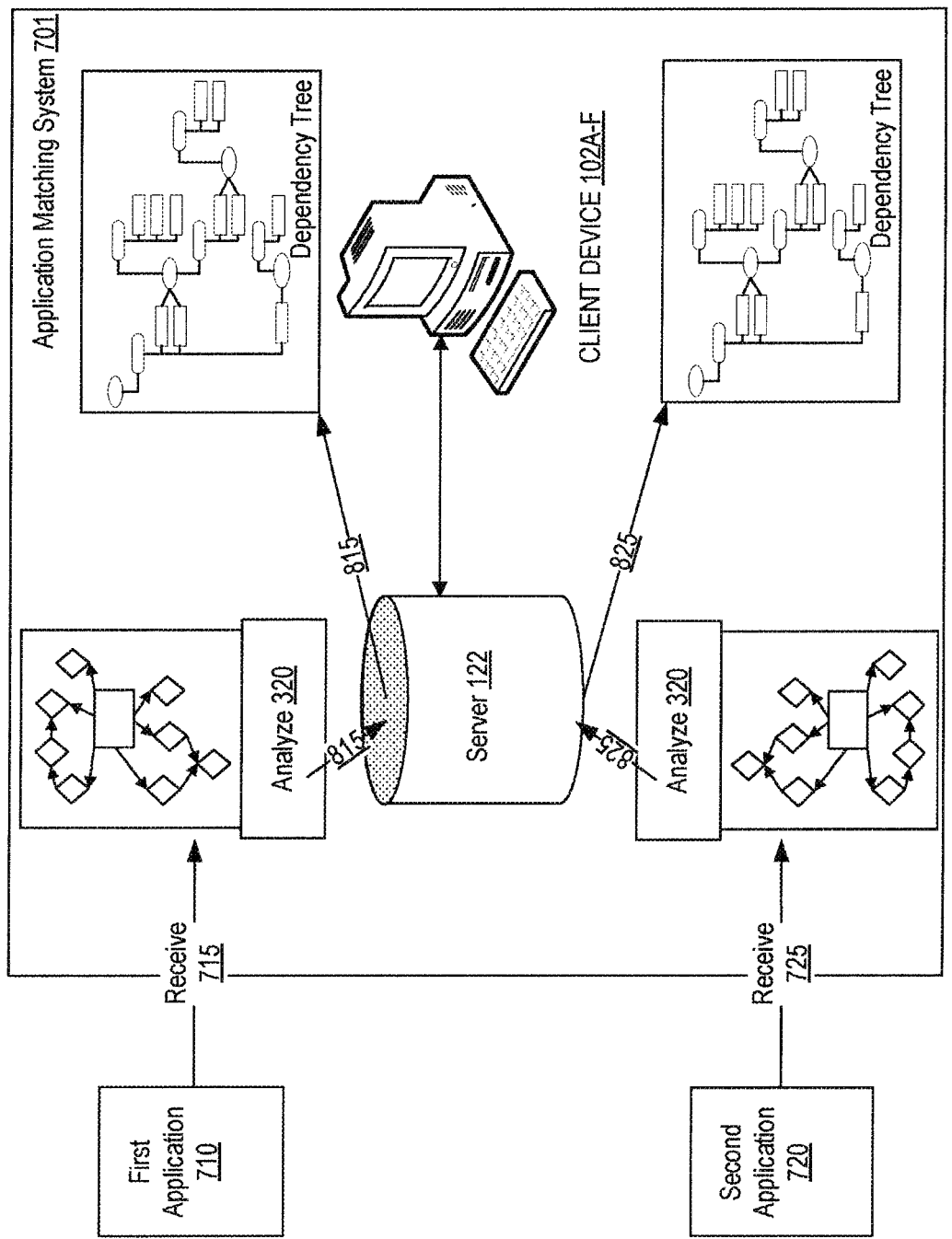
FIG. 8 is a block diagram showing an exemplary embodiment of application matching system analyzing dependency trees associated with applications, consistent with embodiments of the present disclosure.
Figure 9:
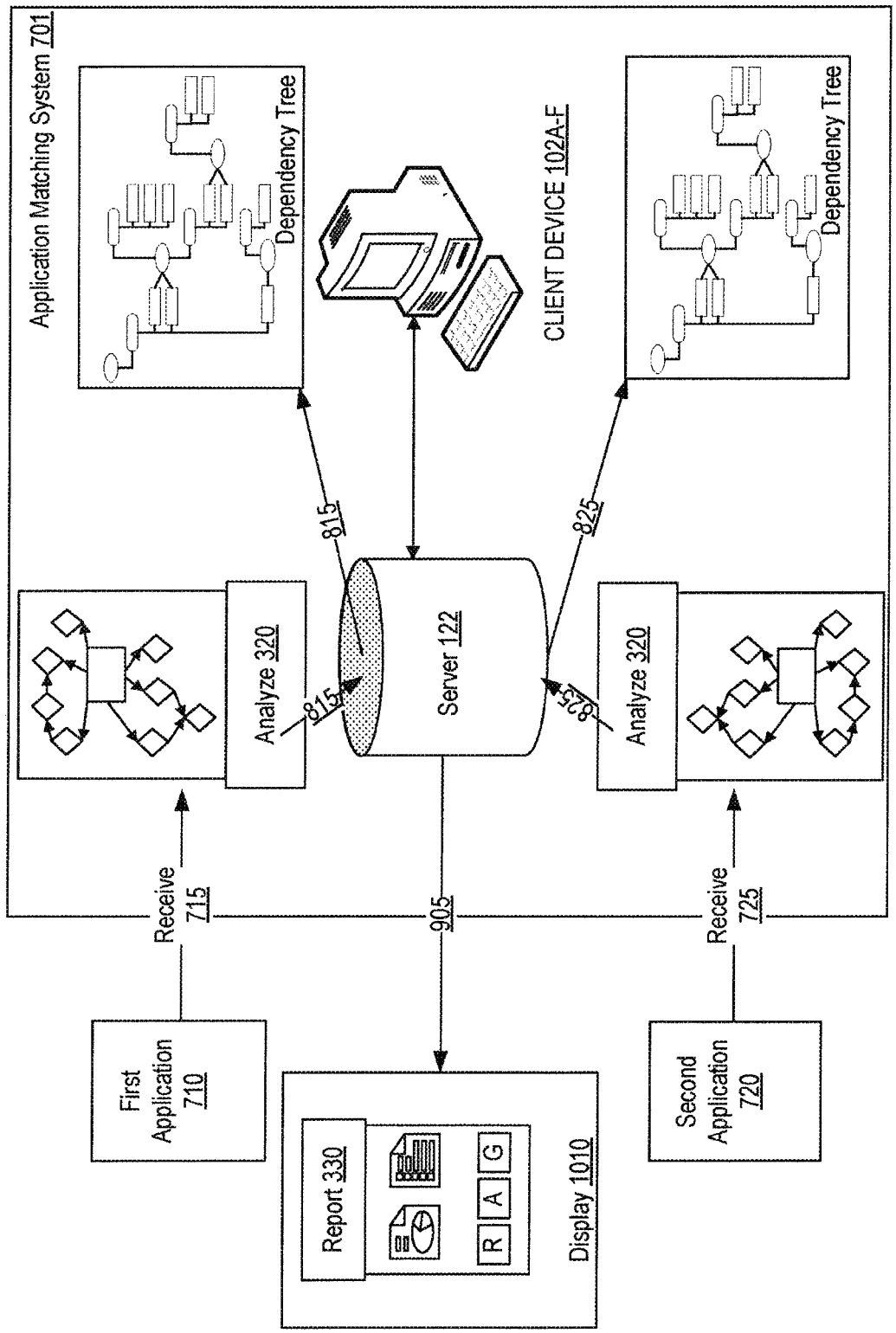
FIG. 9 is a block diagram showing an exemplary embodiment of application matching system determining and displaying matching status of an application, consistent with embodiments of the present disclosure.

FIGS. 7-9 depict block diagrams illustrating how application matching system 701 determines a matching status between two or more applications, consistent with embodiments of the present disclosure. FIG. 7 depicts an application matching system receiving, at 715 and 725, a request for determining a matching status between a first application (e.g., first application 710) and a second application (e.g., second application 720). In some embodiments, each of first application 710 and second application 720 can be located in a different hosting system. Requests 715 and 725 can be received at application matching system 701. Application matching system 701 can be similar to an application matching system described in FIG. 3. For simplicity, a block diagram of application matching system 701 is depicted with only server 122 that can host an application matching system and any one or more client devices 102A-F. Receiving 715 can be associated with first application 710 and receiving 725 can be associated with second application 720. First application 710 and second application 720 can either be an MSI application, a non-MSI application, or a web application. In some embodiments, each of first application 710 and second application 720 can be a new application that can be received from either within the application matching system 701 or external to application matching system 701. Alternatively, each of first application 710 and second application 720 can be an existing application that is currently residing at application matching system 701. In some embodiments, each of first application 710 and second application 720 can be a newer version of an existing application that is currently residing at application matching system 701. In some embodiments, a received request can include both the first application and the second application. Alternatively, each of first application 710 and second application 720 can be an application whose installer is missing and is currently running (or executing) such that the application's main executable can be identified and further processed to build a dependency tree.

Server 122 can host a database (e.g., database 500), where a plurality of applications can reside. In some embodiments, each of the plurality of applications residing at server 122 can be organized into a dependency tree (e.g., dependency tree 400) associated with each of the plurality of the applications. Dependency tree can be created for any application that uses accessible linkage that can be queried (such as, for example, API imports and API exports). For example, accessible linkage can include IAT and EAT in a portable execution (or a new executable) file. It is understood that an application can include dependencies between files (e.g., executables files) and/or API calls (e.g., import address table and export address table) that can include any number of hierarchies (e.g., three-levels of hierarchy shown in dependency tree 400).

FIG. 8 depicts, at 815 and 825, an application matching system organizing each of first application 710's intrinsic data and second application 720's intrinsic data into two separate dependency trees. The process of organizing an application's intrinsic data into a dependency tree can be the same as the dependency tree described above in FIG. 4. As described in FIG. 4, a dependency tree can be created by traversing through files (e.g., executable files like .exe and/or .dll) and/or API calls (e.g., calls associated with import address table and export address tables) included in the application. In some embodiments, first application 710 and/or second application 720 can already be organized into their respective dependency trees before requests 715 and 725 are received.

FIG. 8 further depicts that application matching system 701 can access a first dependency tree representing first application 710 and a second dependency tree representing second application 720. As shown by labels 815 and 825 in FIG. 8, one or more values (e.g., hash values) can be computed for each application and then the one or more computed values for each application can be compared between the two applications. Application matching system 701, at 815 and 825, can perform a computation of one or more hash values for the first dependency tree and one or more hash values for the second dependency tree. In some embodiments, one or more hash values for a particular dependency tree can represent the entire dependency tree of the particular dependency tree. For example, a hash value can be for a top-level file associated with the dependency tree (e.g., File 1.exe 410 of dependency tree 400). Alternatively, the one or more hash value can be computed for one or more portions of the particular dependency tree (i.e., each portion can be associated with each file and/or API call of the particular dependency tree). For example, one or more hash values can be computed for a one or more files of the dependency tree (e.g., File 2.dll 410 and File 3.dll 450 of dependency tree 400). In some embodiments, the one or more values of the first dependency tree and/or the one or more values of the second dependency tree can be acquired by application matching system 701, wherein the acquired values have been previously computed and stored in a database (e.g., database 500). That is, the one or more values can either be computed within application matching system 701 or external to application matching system 701.

It will be understood that a number of hash values that can be computed for each dependency tree can be based on a total number of files (e.g., executable files) included in the dependency tree. For example, if a dependency tree includes 4 files as in dependency tree 400 (File 1.exe 410; File 2.dll 430; File 3.dll 450; and Kernel32.dll 460), 4 different hash values can be computed for dependency tree 400. That is, a hash value can be computed for each of the files that are included in the dependency tree. Accordingly, in some embodiments, a plurality of hash values can be computed for each dependency tree and therefore for each application. In some embodiments, a hash value for a particular file can include all files that it may further depend on. For example, a hash value for File 2.dll 430 can also include File 3.dll 450. Alternatively, a hash value for a particular file can only include the particular file and might not include any file that it may further depend on. For example, a hash value for File 2.dll 430 need not include File 3.dll 450.

In some embodiments, a hash value can be computed for all hash values that have been computed for all files included in dependency tree 400 (e.g., 4 files listed above). In some embodiments, this hash value can be the application's fingerprint that uniquely identifies the application. An advantage of using a fingerprint hash value can be that when a fingerprint hash value of two applications match, there is no need to compare hash values for each file at a lower level of hierarchy of an application.

Application matching system 701 can perform a comparison between the one or more values of the first dependency tree and the one or more values of the second dependency tree. In some embodiments, the comparison can include bit-by-bit comparison of the values. For example, an MD5 hash function results in a 128-bit hash value, whereas an SHA-2 hash function can result in a hash value ranging from 224 bits to 512 bits. In embodiments using MD5 hash function, the comparison step can include comparing each bit of the 128-bit hash value between the one or more hash values of the first dependency tree and the one or more hash values of the second dependency tree. The bit-by-bit comparison can result in either a match or no match between any pair of hash values. Application matching system 701 can perform a determination of a matching status between the first application and the second application based on the comparison of the hash values. If the bit-by-bit comparison, for example, results in a match between the one or more hash values of the first dependency tree and the one or more hash values of the second dependency tree, a matching status signifying a perfect match (the hash values are identical between the first dependency tree and the second dependency tree) between the first application and the second application can be reported. If, on the other hand, the bit-by-bit comparison results in a no match (e.g., difference of at least one-bit) between the first hash value and the second hash value, a matching status signifying no match between the first application and the second application can be reported. Application matching system 701 can report a matching status in a report (e.g., Report 330) depicted at 905 of FIG. 9.

FIG. 9 depicts an application matching system displaying, at 905, a matching status between the first and second applications. In some embodiments, the matching status can be displayed on a graphical user interface. The displayed matching status can include displaying at least one status icon for each pair of applications (e.g., first application 710 and second application 720). For example, a displayed status icon can include one of the following icons: red (R), amber (A), and green (G), which can represent different statuses of matching status between first application 710 and second application 720, or portions thereof. In some embodiments, icon G can indicate that a matching status between two or more applications is at least above a predetermined percentage. An icon R can indicate that a matching status between two or more applications is below a predetermined percentage. An icon A can indicate either that a matching status between two or more applications is unknown or that a matching determination is unsuccessful. It will be understood the above-listed definitions of icons are merely exemplary and other definitions are possible. In some embodiments, a matching status between the first application 710 and the second application 720 can be displayed on a graphical user interface on one or more client devices 102A-F. In some embodiments, a matching status between the first application 710 and the second application 720 can be displayed on a graphical user interface on a display associated with server 122 hosting application matching system 701.

Figure 10:
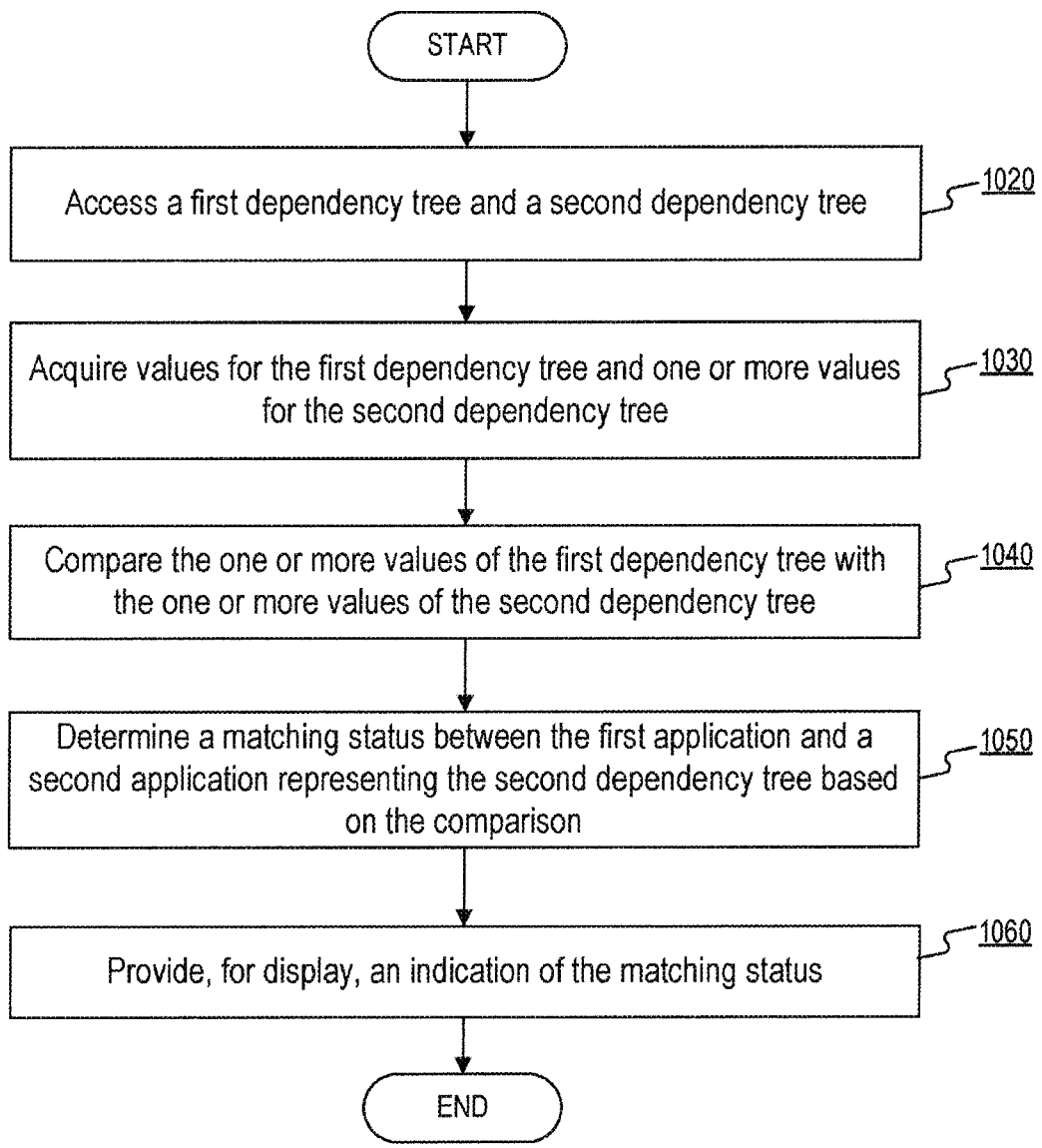
FIG. 10 is a flowchart illustrating an exemplary method for determining application matching status, consistent with embodiments of the present disclosure.

FIG. 10 illustrates a flowchart that shows an exemplary method for determining a matching status between two applications, consistent with embodiments of the present disclosure. Referring to FIG. 10, it will be appreciated that the illustrated procedure can be altered to change the order of the steps, delete steps, or further include additional steps.

In step 1020, an application matching system (e.g., application matching system 701) can access a first dependency tree representing a first application (e.g., first application 710) and a second dependency tree representing a second application (e.g., second application 720). In step 1030, the application matching system can acquire one or more values for the first dependency tree and one or more values for the second dependency tree, wherein the acquired values have been previously computed and stored in a database (e.g., database 500). That is, the one or more values can either be computed within the application matching system or external to the application matching system. In some embodiments, the application matching system can perform a computation of one or more hash values for the first dependency tree and one or more hash values for the second dependency tree. In some embodiments, as described in FIG. 8, one or more hash values for a particular dependency tree can represent the entire dependency tree of the particular dependency tree or one or more portions of the particular dependency tree (i.e., each portion can be associated with each file and/or API call of the particular dependency tree).

In step 1040, the application matching system can perform a comparison of the computed first hash value (or a first set of hash values) and the computed second hash value (or a second set of hash values). In some embodiments, the comparison can include bit-by-bit comparison of the values. The bit-by-bit comparison can result in either a match or no match between any pair of hash values.

In step 1050, the application matching system can determine a matching status between the first application and the second application based on the comparison of the hash values. If the bit-by-bit comparison, for example, results in a match between the one or more hash values of the first dependency tree and the one or more hash values of the second dependency tree, a matching status signifying a perfect match (the hash values are identical between the first dependency tree and the second dependency tree) between the first application and the second application can be reported. If, on the other hand, the bit-by-bit comparison results in a no match (e.g., difference of at least one-bit) between the first hash value and the second hash value, a matching status signifying no match between the first application and the second application can be reported.

In step 1060, the application matching system can provide, for display a report (e.g., report 330 as depicted in FIG. 9) indicating the matching status between the first application and the second application.

The flowchart of FIG. 10 can further be described with an exemplary scenario where a matching status between two applications needs to be determined. In this exemplary scenario, the application matching system determines a matching status between a first application, Microsoft Word 2007™, and a second application, unknown application. A dependency tree exists for each of the first and second applications. In this example, the first dependency tree (representing Microsoft Word 2007™ application) includes a top-level file name, File 1.exe, whereas the second dependency tree (representing an unknown application) includes a top-level file name, SomeOtherName.exe. After the application matching system accesses the first and second applications (step 1020), in step 1030, the application matching system can compute a first hash value for File 1.exe and a second hash value for SomeOtherName.exe. In step 1040, the application matching system can compare the first hash value with the second hash value, bit-by-bit. If the application matching system determines that the first hash value matches with the second hash value, the application matching system can generate a report showing that there is a perfect match between Microsoft Word 2007™ and the unknown application. Given the perfect match of hash values, even though the second application is unknown, it may be safe to identify the unknown application is also a Microsoft Word 2007™ application. In some embodiments, the second application can reside in a system that is different from a system where the first application resides.

Continuing with the above exemplary scenario, if the application matching system determines that there is no match between the first hash value and the second hash value, where the hash values are computed for the top-level files of the respective applications (File 1.exe and SomeOtherName.exe), steps 1030 through 1050 can be repeated by traversing down the hierarchy level of dependency trees of the applications. For example, a hash value can be computed for files at a second-level hierarchy of the dependency tree (e.g., File 2.dll 430 of dependency tree 400), for further comparison. If the comparison of hash values at the second-level hierarchy of the dependency trees results in a match between the two applications, the application matching system can identify that the two applications include the same files at the second-level hierarchy (e.g., File 2.dll 430 of dependency tree 400) and below that were used for computing the hash value. That is, while the second application might not be identical to Microsoft Word 2007™, a second-level hierarchy match of hash values indicates that the second application shares some common files as that of Microsoft Word 2007™ application. If, however, the comparison of the hash values at the second-level hierarchy of the dependency tree does not match, then the process can be repeated to the third-level hierarchy of the dependency tree (e.g., File 3.dll 450 of dependency tree 400). It will be understood that the hash values can be computed (step 1030) and later compared (step 1040) for any number of hierarchies of an application's dependency tree.

In some embodiments, a match between two applications can be defined when a comparison between the hash values is above a predetermined threshold. For example, the predetermined threshold can be any number equal to or less than one hundred percent. If the predetermined threshold is equal to one hundred percent, such a match can be referred to as a perfect match. Alternatively, if the predetermined threshold is less than one hundred percent, such a match can be referred to as a partial match. A partial match scenario can be applicable in cases where a hash value is computed for each file of the dependency tree and matching between two applications is determined based on whether a percentage of the number of hash values that are same between the two applications is at least equal to the predetermined threshold. For example, if each of Microsoft Word 2007™ and the unknown application have 4 files (similar to dependency tree 400) included in their respective dependency trees and let us also assume that a predetermined threshold is set as seventy percent. If a comparison of hash values for each of the four files of the two applications results in a match of three of the four files (i.e., seventy five percent), the application matching system will determine that portions of the unknown application matches portions of the Microsoft Word 2007™ application.

In practice, while a predetermined threshold of less than one hundred percent signifies that the two applications are not identical, a predetermined threshold of seventy five percent, for example, signifies that the two applications share many of the common files and can be closely related. For example, if three of the four files match between Microsoft Word 2007™ and the unknown application, it can signify that the unknown application can be a Microsoft Word™ application that is different from 2007 version of the application (e.g., Microsoft Word 2010™). Another example can signify a situation where the unknown application can still be a Microsoft Word 2007™ but one of the files was not properly installed. Accordingly, a predetermined threshold of less than one hundred percent can result in useful insights in identifying closely related applications, which can help in making application migration from one system to another more efficient. In some embodiments, a match between applications can be based on hash values of both files as well as API calls. Alternatively, a match between applications can be defined such that it is based on hash values of either files or API calls but not both.

In some embodiments, the application matching system can determine a matching status between two or more applications based on an exemplar application as a reference. For example, when an organization is migrating its applications from one platform to another, applications residing in different systems of the organization need to be verified for compatibility with the new (to-be-migrated) platform, as described in U.S. patent application Ser. No. 14/094,697, titled "Methods and Systems for machine learning to discover application compatibility," filed on Dec. 2, 2013, the entirety of which is incorporated herein expressly. The application matching process described in FIG. 10 (and depicted in FIGS. 7-9) can be utilized to make the application migration process more efficient. In some embodiments, the application matching system can receive an exemplar application (e.g., Microsoft Word 2007™) whose dependency tree and associated hash value (or a set of hash values) can be first computed. The application matching system can operate on applications involved in the migration process such that the application matching system can identify all applications that match the exemplar application by computing (step 1030) and comparing (step 1040) hash values associated with each of the applications involved in the migration process.

After the application matching system determines (step 1050) a matching status for each application as compared with the exemplar application such that it identifies all applications that match the exemplar application. In such a scenario, an application compatibility system checking for compatibility of applications with a particular platform could only check the exemplar application for compatibility with the new platform. That is, after the application compatibility system verifies that the exemplar application is compatible with the new platform, the application compatibility system can automatically mark that all applications matching the exemplar application are also compatible with the new platform without having to check a compatibility status for any of those applications that match the exemplar application. As will be appreciated, the above-described scenario improves an efficiency of application compatibility with platform by reducing a processing iterations and time by utilizing the application matching process of FIG. 10.

In some embodiments, the above-described process of improving efficiency of an application compatibility system can also be extended to verify whether applications are correctly installed on various platforms. In some embodiments, determining a matching status between applications can be performed over a low bandwidth network connection. In such embodiments, the hash value can be a small string of data (e.g., 32-bit hash value) that can uniquely represent an application and by transmitting only hash values that are relatively short in size, a matching determination can be performed over a low bandwidth network connection. That is, application matching system can perform application matching either on one electronic device (e.g., server 122) or distributed over a network, either a high bandwidth network or a low bandwidth network.

The methods disclosed herein may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

A portion or all of the methods disclosed herein may also be implemented by an application specific integrated circuit (ASIC), a field-programmable gate array (FPGA), a complex programmable logic device (CPLD), a printed circuit board (PCB), a digital signal processor (DSP), a combination of programmable logic components and programmable interconnects, a single central processing unit (CPU) chip, a CPU chip combined on a motherboard, a general purpose computer, or any other combination of devices or modules capable of performing media format substitution disclosed herein.

In the preceding specification, the systems and methods have been described with reference to specific exemplary embodiments. It will, however, be evident that various modifications and changes may be made without departing from the broader spirit and scope of the disclosed embodiments as set forth in the claims that follow. The specification and drawings are accordingly to be regarded as illustrative rather than restrictive. Other embodiments may be apparent to those skilled in the art from consideration of the specification and practice of the embodiments disclosed herein.

The invention claimed is:

1. A server comprising: one or more processors configured to:
    organize intrinsic data in first and second applications, with the intrinsic data being organized as respective first and second dependency trees representing executable files and application programming interface (API) calls in the respective applications, compute top-level hash values based on the organized intrinsic data for a top-level hierarchy of the first and second dependency trees, with the top-level hash values being returned by a hash function identifying the first and second applications respectively,
    compare the top-level hash values for the top-level hierarchy of the first and second dependency trees for a match, in response to their not being a match, compute second-level hash values for a second-level hierarchy of the first and second dependency trees, compare the second-level hash values of the second-level hierarchy of the first and second dependency trees for a match, and provide an indication of a matching status between the second-level hash values of the second-level hierarchy of the first and second dependency trees based on the compare.

2. The server according to claim 1 wherein the intrinsic data comprises API imports and API exports that can be queried.

3. The server according to claim 1 wherein the intrinsic data comprises an import address table (IAT) and an export address table (EAT) in the one or more executable files.

4. The server according to claim 1 wherein the indication of a matching status comprises at least one of: generation of a first icon indicating that the matching status is less than a percentage threshold of matches between the determined relationships of the first and second applications; generation of a second icon indicating that the matching status is greater than the percentage threshold of matches between the determined relationships of the first and second applications; and generation of a third icon indicating that the matching status is unknown or unsuccessful.

5. The server according to claim 1 wherein the first application is associated with a first platform, and the second application is associated with a second platform that is different from the first platform.

6. The server according to claim 5 wherein the first and second applications are the same applications.

7. The server according to claim 6 wherein the second application is a newer version of the first application.

8. A method for operating a server comprising: organizing intrinsic data in first and second applications, with the intrinsic data being organized as respective first and second dependency trees representing executable files and application programming interface (API) calls in the respective applications; computing top-level hash values based on the organized intrinsic data for a top-level hierarchy of the first and second dependency trees, with the top-level hash values being returned by a hash function identifying the first and second applications respectively, in response to their not being a match, computing second-level hash values for a second-level hierarchy of the first and second dependency trees, comparing the second-level hash values of the second-level hierarchy of the first and second dependency trees for a match, and providing an indication of a matching status between the second-level hash values of the second-level hierarchy of the first and second dependency trees based on the compare.

9. The method according to claim 8 wherein the intrinsic data comprises API imports and API exports that can be queried.

10. The method according to claim 8 wherein the intrinsic data comprises an import address table (IAT) and an export address table (EAT) in the one or more executable files.

11. The method according to claim 8 wherein the indication of a matching status comprises at least one of: generating a first icon indicating that the matching status is less than a percentage threshold of matches between the determined relationships of the first and second applications; generating a second icon indicating that the matching status is greater than the percentage threshold of matches between the determined relationships of the first and second applications; and generating a third icon indicating that the matching status is unknown or unsuccessful.

12. The method according to claim 8 wherein the first application is associated with a first platform, and the second application is associated with a second platform that is different from the first platform.

13. The method according to claim 12 wherein the first and second applications are the same applications.

14. A non-transitory computer readable medium for operating a server, and with the non-transitory computer readable medium having a plurality of computer executable instructions for causing the server to perform steps comprising:
    organizing intrinsic data in first and second applications, with the intrinsic data being organized as respective first and second dependency trees representing executable files and application programming interface (API) calls in the respective applications;
    computing top-level hash values based on the organized intrinsic data for a top-level hierarchy of the first and second dependency trees, with the top-level hash values being returned by a hash function identifying the first and second applications respectively, in response to their not being a match, computing second-level hash values for a second-level hierarchy of the first and second dependency trees, comparing the second-level hash values of the second-level hierarchy of the first and second dependency trees for a match, and providing an indication of a matching status between the second-level hash values of the second-level hierarchy of the first and second dependency trees based on the compare.

* * * * *